(12) United States Patent
Huang et al.

(10) Patent No.: US 12,044,874 B2
(45) Date of Patent: Jul. 23, 2024

(54) LACE FABRIC OF HELICAL STRUCTURE CONTAINING TWISTED OPTICAL FIBER THREADS AND PRODUCTION METHOD THEREFOR

(71) Applicant: FOSHAN JIEPIN TOY INDUSTRIAL CO., LTD., Foshan (CN)

(72) Inventors: Zhi Huang, Foshan (CN); Zhenjiang Qu, Foshan (CN)

(73) Assignee: FOSHAN JIEPIN TOY INDUSTRIAL CO., LTD., Foshan (CN)

( * ) Notice: Subject to any disclaimer, the term of this patent is extended or adjusted under 35 U.S.C. 154(b) by 0 days.

(21) Appl. No.: 17/924,990

(22) PCT Filed: Jan. 14, 2022

(86) PCT No.: PCT/CN2022/072135
§ 371 (c)(1),
(2) Date: Nov. 11, 2022

(87) PCT Pub. No.: WO2023/130497
PCT Pub. Date: Jul. 13, 2023

(65) Prior Publication Data
US 2024/0061164 A1    Feb. 22, 2024

(30) Foreign Application Priority Data
Jan. 8, 2022 (CN) .......................... 202210018722.4

(51) Int. Cl.
*F21V 8/00*      (2006.01)
*D01F 8/06*      (2006.01)
(Continued)

(52) U.S. Cl.
CPC ............... *G02B 6/001* (2013.01); *D01F 8/06* (2013.01); *D01F 8/10* (2013.01); *D01F 8/16* (2013.01);
(Continued)

(58) Field of Classification Search
CPC ..................................................... G02B 6/001
See application file for complete search history.

(56) References Cited

FOREIGN PATENT DOCUMENTS

| CN | 104831471 A | 8/2015 |
|---|---|---|
| CN | 105040264 A | 11/2015 |

(Continued)

*Primary Examiner* — Joseph L Williams
(74) *Attorney, Agent, or Firm* — Nitin Kaushik

(57) ABSTRACT

The present invention provides a lace fabric of a helical structure containing twisted optical fiber threads and a production method therefor. The lace fabric includes light guiding threads, an external sleeve and braided ropes. The light guiding threads and the braided ropes are mutually twisted to form a whole body; the external sleeve is further sleeved outside the light guiding threads and the braided ropes; an LED light source module is arranged at the outer parts of the light guiding threads and the braided ropes; and a light-emitting end of the LED light source module and the light guiding threads are arranged opposite to each other. The present invention is safe, is low in cost, is conveniently applied to and combined into various daily supplies, is used in some spaces with little light, such as outdoors in the night and other places.

7 Claims, 4 Drawing Sheets

(51) Int. Cl.
  *D01F 8/10* (2006.01)
  *D01F 8/16* (2006.01)
  *D07B 1/02* (2006.01)
  *D07B 1/06* (2006.01)
  *D07B 1/14* (2006.01)
  *D07B 1/16* (2006.01)

(52) U.S. Cl.
  CPC ........... *D07B 1/025* (2013.01); *D07B 1/0673* (2013.01); *D07B 1/148* (2013.01); *D07B 1/162* (2013.01); *D07B 2201/104* (2013.01); *D07B 2201/1096* (2013.01); *D07B 2201/2009* (2013.01); *D07B 2201/2066* (2013.01); *D07B 2201/2087* (2013.01); *D07B 2201/2092* (2013.01); *D07B 2201/2096* (2013.01); *D07B 2205/2014* (2013.01); *D07B 2205/2017* (2013.01); *D07B 2205/2032* (2013.01); *D07B 2205/3025* (2013.01); *D07B 2501/20* (2013.01); *D10B 2401/20* (2013.01)

(56) References Cited

FOREIGN PATENT DOCUMENTS

| CN | 204780131 U | 11/2015 |
| CN | 115045128 A  * | 9/2022 |

* cited by examiner

S1, Prepare light guiding threads, specifically, coat outer layers of fibers prepared by withdrawing threads from high-purity and high-transparency or polystyrene with a fluorine-containing polymer or fluorine-containing polymer to prepare polymeric light guiding

S2, Prepare braided ropes, specifically, strand high-strength fiber threads and reflective threads through a strander for interweaving, and adhere and fix the woven high-strength fiber threads and reflective threads by brushing a thermosetting adhesive to prepare the braided ropes for standby

S3, Strand wires, specifically, make three light guiding threads and four braided ropes arranged at intervals and closely arranged into a bundle, and strand the bundle with the strander to prepare a helically twisted wire

S4, Externally coat rubber, specifically, form a rubber protective layer on the outer surface of the helically twisted wire through extrusion molding of an elastomer material with a plastic extruder to prepare an external sleeve

S5, Conduct light-transmissive detection, specifically, detect whether a back end portion of the lace fabric emits light by aligning an LED light source to the light guiding threads

S6, Tailor and package, specifically, tailor a qualified light transmissive product according to a design size, and package the tailored product for shipping out

FIG. 4

LACE FABRIC OF HELICAL STRUCTURE CONTAINING TWISTED OPTICAL FIBER THREADS AND PRODUCTION METHOD THEREFOR

TECHNICAL FIELD

The present invention relates to the technical field of light emission and illumination, in particular to a lace fabric of a helical structure containing twisted optical fiber threads and a production method therefor.

BACKGROUND

A traditional braided rope cannot emit light and can be used at a place with little light generally only when luminescent powder or a reflective material prepared from chemical components is added; whereas LED lamp filaments are embedded into some braided rope products for using the braided rope products at the place with little light, however, such products has the biggest problem that the braided ropes require to be electrified self, and the lamps are very easily partially damaged in the use due to existence of LED lamp chips in the middles and then lose the use effect.

A light guiding fiber is formed by two layers of glasses with different refractive indexes. An inner layer is an optical inner core and has a diameter from several microns to tens of microns; and an outer layer has a diameter of 0.1-0.2 mm. In general, the refractive index of the glass of the inner core is larger than that of the outer layer of glass by 1%. According to the principles of light refraction and total reflection, if angles at which light is incident upon an interface of the inner core and an interface of the outer layer are larger than a critical angle producing total reflection, the light cannot penetrate through the interfaces and is totally reflected. Now, there is still a certain development space of applying an optical fiber to the aspect of preparing a luminous rope body by the lace fabric and the like.

In combination with the above problems, it is now necessary for a lace fabric which can emit light and be freely bent without affecting the lighting effect and a production method therefor, so as to solve the above problems.

SUMMARY

The present invention provides a lace fabric of a helical structure containing twisted optical fiber threads and a production method therefor and aims at solving the problem of lacking a lace fabric which can be freely bent and is good in lighting effect entirely by making a technical modification on an existing lace fabric.

To solve the above technical problems, the present invention specifically employs the following technical solution:

A lace fabric of a helical structure containing twisted optical fiber threads, comprising light guiding threads, an external sleeve and braided ropes. The light guiding threads and the braided ropes are mutually twisted to form a whole body; the external sleeve is further sleeved outside the light guiding threads and the braided ropes; an LED light source module is arranged at the outer parts of the light guiding threads and the braided ropes; a light-emitting end of the LED light source module and the light guiding threads are arranged opposite to each other;

the braided ropes are formed by interweaving high-strength fiber threads and reflective threads, and each high-strength fiber thread is formed by helically twisting and weaving a color or various colors of dyed fiber threads; and an inner cavity of the external sleeve is further internally provided with a plurality of tensile strands, and the tensile strands are high-strength PE threads or steel wires.

Preferably, three light guiding threads are provided; four braided ropes are provided; and the light guiding threads and the braided ropes are mutually wound in the helical structure.

Preferably, the external sleeve is made of a soft transparent PVC, silica gel or TPE material; and a wear resistant layer is arranged at the outer part of the external sleeve.

Preferably, the wear resistant layer is made of transparent rubber.

Preferably, the light guiding threads are polymeric light guiding fibers; and each polymeric light guiding fiber comprises a core material and a jacketing sheath material.

Preferably, the core material is a high-purity and high-transparency polymethyl methacrylate or polystyrene fiber; and the jacketing sheath material is fluorine-containing polymer or organic silicone polymer.

A production method for the lace fabric of the helical structure containing the twisted optical fiber threads, comprising the following steps:

S1, preparing light guiding threads, specifically, coating outer layers of fibers prepared by withdrawing threads from high-purity and high-transparency polymethyl methacrylate or polystyrene with fluorine-containing polymer or organic silicone polymer to prepare polymeric light guiding fibers;

S2, preparing braided ropes, specifically, stranding the high-strength fiber threads and the reflective threads through a strander for interweaving, and adhering and fixing the woven high-strength fiber threads and reflective threads by brushing a thermosetting adhesive to prepare the braided ropes for standby;

S3, stranding wires, specifically, making the plurality of light guiding threads and the braided ropes arranged at intervals and closely arranged into a bundle, and stranding the bundle with the strander to prepare a helically twisted wire;

S4, externally coating rubber, specifically, forming a rubber protective layer on the outer surface of the helically twisted wire through extrusion molding of a PVC elastomer material with a plastic extruder to prepare an external sleeve;

S5, conducting light-transmissive detection, specifically, detecting whether a back end portion of the lace fabric emits light by aligning an LED light source to the light guiding threads; and S6, tailoring and packaging, specifically, tailoring a qualified light transmissive product according to a design size, and packaging the tailored product for shipping out.

Preferably, in the step S3 of stranding the wires, tensile strands provided with a plurality of high-strength PE threads or steel wires are further mixed in the wires, arranged into a bundle and then stranded by the strander.

Compared with the prior art, the present invention has the beneficial effects that:

1) A streamer braided rope made in the present invention does not contain LED lamp filaments self and achieves the light transmission effect by emitting light, by a light-emitting spotlight, into the light guiding threads; a product with a such design is safe, is low in cost and is conveniently applied to and combined into various daily supplies; and in some spaces with little light, such as outdoors in the night and other places, a product processed by such steamer rope may remind vehicles and pedestrians in the distance, so as to exert the effect of safe avoidance.

2) The present invention employs the optical fibers as the light guiding threads and emits the light by a high-brightness LED light source, so that the characteristics of the optical fibers are fully used; by using the characteristics of guiding and emitting the light of the optical fibers, the optical fibers may be made into various colors of fluorescence fibers for displaying various visual arts and may be widely applied to clothing, bags and suitcases, toys, electronic products, pet supplies, sport equipment, household products and decorative materials; and also, in the present invention, the braided ropes are impregnated with the reflective threads, so that the illumination brightness is more significant, and then the use effect is better.

3) In the present invention, the wires emit the light through superbright LED optical fibers in a dark environment or in the night, so as to achieve the illumination effect; and meanwhile, the transparent optical fiber twisted braided rope is fashionable in design, can serve as a rope body for use whether a light emitting function is opened or closed in the daytime or the night, has a design with an aesthetic feeling and is convenient to use.

4) The present invention is widely applied and may be applied to the clothing, the bags and the suitcases, the toys, the electronic products, the pet supplies, the sport equipment, the household products and the decorative materials.

5) By using the polymeric light guiding fibers to make the light guiding threads, the present invention has the characteristic that the light guiding fibers in a large size and with a large numeric value of aperture can be made, which are high in light source coupling efficiency and good in flexibility, do not affect the light guiding ability when being slightly bent, and is liable in arrangement and adhesion, convenient to use and low in cost.

BRIEF DESCRIPTION OF DRAWINGS

FIG. 4 is a diagram of steps of a production process of the present invention.

Figure 1:
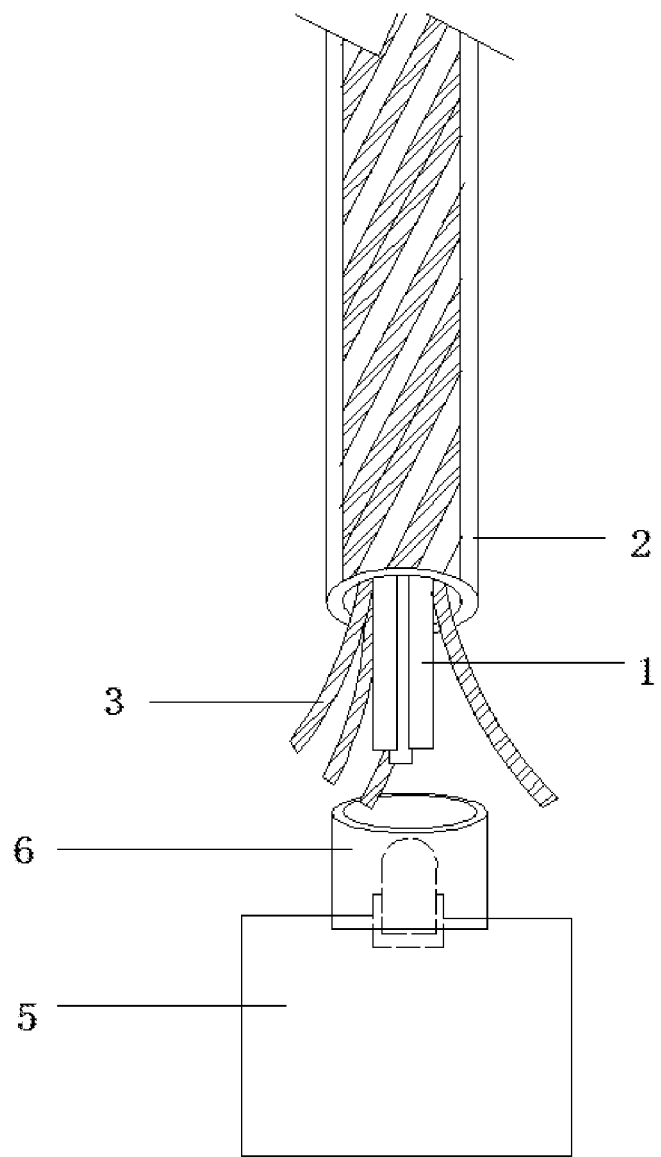
FIG. 1 is a schematic diagram of a structure of the present invention.

REFERENCE NUMERALS light guiding thread 1, external sleeve 2, braided rope 3, tensile strand 4, LED light source module 5, connection portion 6.

DETAILED DESCRIPTION OF THE EMBODIMENTS

The specific content of the present invention is described in detail below in combination with the drawings and the embodiments.

Figure 2:
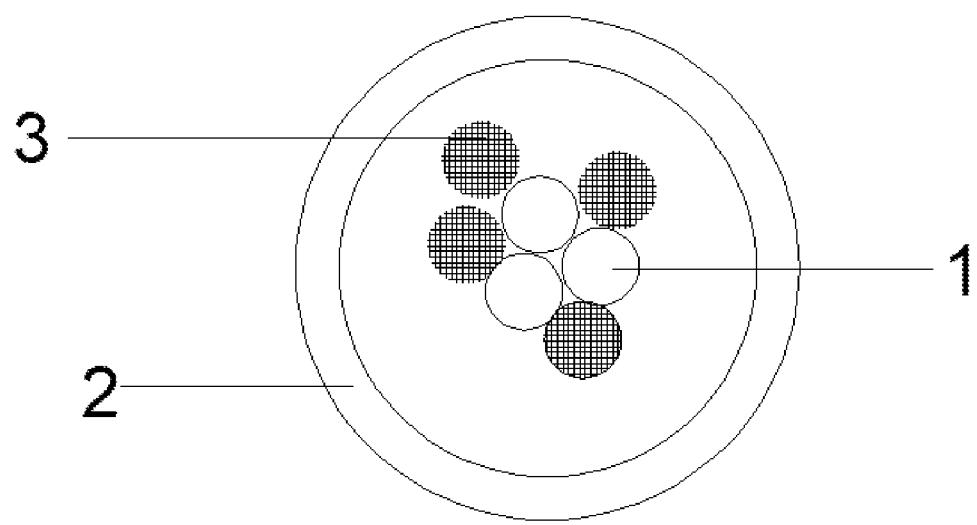
FIG. 2 is a schematic diagram of a cross section of the present invention.
Figure 3:
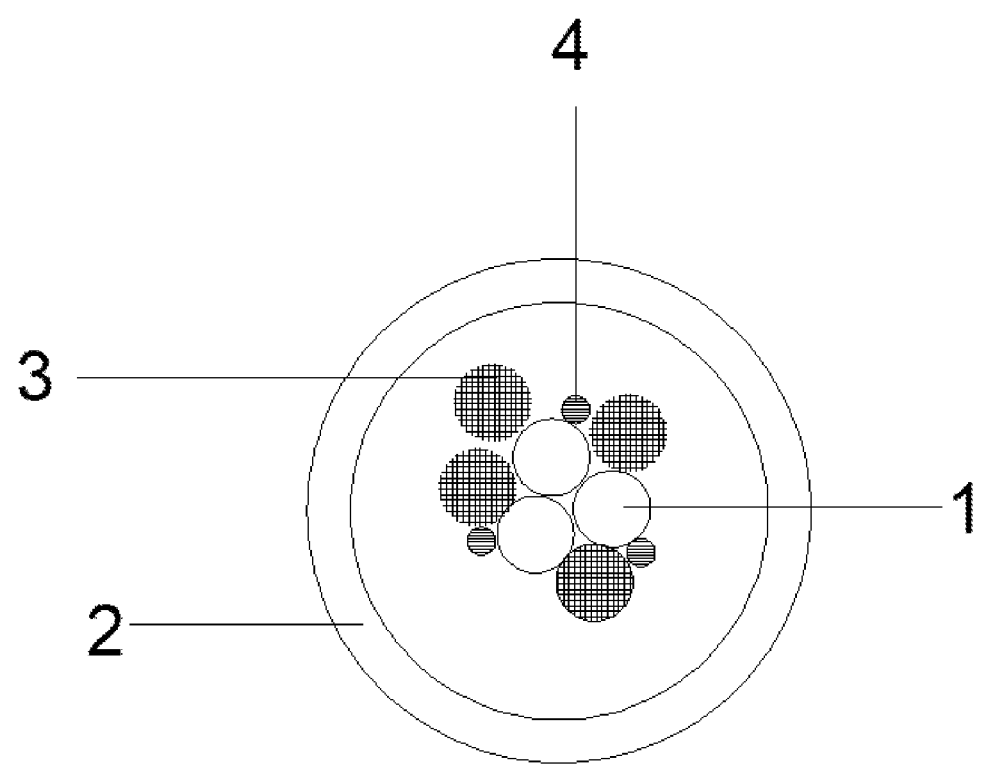
FIG. 3 is a cross-sectional schematic view of impregnated tensile strands of the present invention.

As shown in FIGS. 1-4, the embodiments of the present invention provide a lace fabric of a helical structure containing twisted optical fiber threads and a production method therefor. The lace fabric comprises light guiding threads 1, an external sleeve 2 and braided ropes 3. The light guiding threads 1 and the braided ropes 3 are mutually twisted to form a whole body; the external sleeve 2 is further sleeved outside the light guiding threads 1 and the braided ropes 3; an LED light source module 5 is arranged at the outer parts of the light guiding threads 1 and the braided ropes 3; and a light-emitting end of the LED light source module 5 and the light guiding threads 1 are arranged opposite to each other.

Further, the braided ropes 3 are formed by interweaving high-strength fiber threads and reflective threads, and each high-strength fiber thread is formed by helically twisting and weaving a color or various colors of dyed fiber threads. Different colors of braided ropes 3 enrich the shape and the appearance of the rope bodies and make the rope bodies more beautiful. Further, in order to improve the tensile properties of the wires, an inner cavity of the external sleeve 2 is further internally provided with a plurality of tensile strands 4, and the tensile strands 4 are high-strength PE threads or steel wires.

Further, in order to obtain better illumination effect, three light guiding threads 1 are provided; four braided ropes 3 are provided; and the light guiding threads 1 and the braided ropes 3 are mutually wound in the helical structure.

Further, the external sleeve 2 is made of a soft transparent PVC material; and a wear resistant layer is arranged at the outer part of the external sleeve 2.

Further, the wear resistant layer is made of transparent rubber. With arrangement of the wear resistant layer, the serve life of the wires can be greatly prolonged.

Further, the light guiding threads 1 are polymeric light guiding fibers; and each polymeric light guiding fiber comprises a core material and a jacketing sheath material. Each light guiding fiber has a cross section in a circular shape.

Further, the core material is a high-purity and high-transparency polymethyl methacrylate or polystyrene fiber; and the jacketing sheath material is a fluorine-containing polymer or organic silicone polymer.

A production method for the lace fabric of the helical structure containing the twisted optical fiber threads, comprising the following steps:

S1, the light guiding threads 1 are prepared, specifically, outer layers of fibers prepared by withdrawing threads from the high-purity and high-transparency or polystyrene are coated with the organic silicone polymer to prepare polymeric light guiding fibers;

S2, the braided ropes 3 are prepared, specifically, the high-strength fiber threads and the reflective threads are stranded through a strander for interweaving, and the woven high-strength fiber threads and reflective threads are adhered and fixed by brushing a thermosetting adhesive to prepare the braided ropes 3 for standby;

S3, wires are stranded, specifically, the three light guiding threads 1 and the four braided ropes 3 are arranged at intervals and closely arranged into a bundle, and the bundle is stranded with the strander to prepare a helically twisted wire;

S4, rubber is externally coated, specifically, a rubber protective layer is formed on the outer surface of the helically twisted wire through extrusion molding of a PVC elastomer material with a plastic extruder to prepare an external sleeve 2;

S5, light-transmissive detection is conducted, specifically, whether a back end portion of the lace fabric emits light is detected by aligning an LED light source to the light guiding threads 1; and S6, tailoring and packaging are conducted, specifically, a qualified light transmissive product is tailored according to a design size, and the tailored product is packaged for shipping out.

Further, in the step S3 of stranding the wires, tensile strands 4 provided with a plurality of high-strength PE threads or steel wires are further mixed in the wires, arranged into a bundle and then stranded by the strander.

The externally arranged LED light source module is further provided with a connection portion 6; and the light guiding threads penetrate through the connection portion 6 and are in butt joint to LED lamps of the LED light source module. With regard to the circumstance requiring light emission with multiple colors, each LED lamp is in butt joint to one light guiding thread through a casing; by turning on and off the three LED lamps in turn or starting different color effects of the LED lamps, the three light guiding threads emit the light or emit different light in turn, so as to achieve different colorful effects and enrich the use experience.

The present invention has the following characteristics that:

1) A streamer braided rope made in the present invention does not contain LED lamp filaments self and achieves the light transmission effect by emitting light, by a light-emitting spotlight, into the light guiding threads; a product with a such design is safe, is low in cost and is conveniently applied to and combined into various daily supplies; and in some spaces with little light, such as outdoors in the night and other places, a product processed by such steamer rope may remind vehicles and pedestrians in the distance, so as to exert the effect of safe avoidance.

2) The present invention employs the optical fibers as the light guiding threads and emits the light by a high-brightness LED light source, so that the characteristics of the optical fibers are fully used; by using the characteristics of guiding and emitting the light of the optical fibers, the optical fibers may be made into various colors of fluorescence fibers for displaying various visual arts and may be widely applied to clothing, bags and suitcases, toys, electronic products, pet supplies, sport equipment, household products and decorative materials; and also, in the present invention, the braided ropes are impregnated with the reflective threads, so that the illumination brightness is more significant, and then the use effect is better.

3) In the present invention, the wires emit the light through superbright LED optical fibers in a dark environment or in the night, so as to achieve the illumination effect; and meanwhile, the transparent optical fiber twisted braided rope is fashionable in design, can serve as a rope body for use whether a light emitting function is opened or closed in the daytime or the night, has a design with an aesthetic feeling and is convenient to use.

4) The present invention is widely applied and may be applied to clothing, bags and suitcases, toys, electronic products, pet supplies, sport equipment, household products and decorative materials.

5) By using the polymeric light guiding fibers to make the light guiding threads, the present invention has the characteristic that the light guiding fibers in a large size and with a large numeric value of aperture can be made, which are high in light source coupling efficiency and good in flexibility, do not affect the light guiding ability when being slightly bent, and is liable in arrangement and adhesion, convenient to use and low in cost.

At last, it should be noted that the above embodiments are only used to illustrate the technical solutions of the present invention and shall not be construed as limitation. Although the present invention is described in detail with reference to preferred embodiments, ordinary skill in the art should understand that modifications or equivalent substitutions may be made on the technical solutions of the utility model without departing from the spirit and the scope of the technical solutions of the present invention, all of which should be contained within the scope of the claims of the present invention.

The used standard parts in the present invention may all be commercially available, and special-shaped parts may be customized according to descriptions in the specification and the drawings. The specific connecting modes of various parts may employ mature conventional means such as bolts, rivets and welding in the prior art; the used machinery, parts and devices are all of conventional models in the prior art; and circuit connection employs a conventional connection mode in the prior art, which will not be described in detail any more here.

In description of the present invention, unless otherwise expressly specified and defined, the terms "mounted", "connected", "coupled" and "fixed" should be understood broadly, for example, as fixed connection, detachable connection or integration; mechanical connection or electrical connection; direct connection, connection through an intermediary medium, communicating between interiors of two elements or interacting between two elements. The meanings of above terms in the present invention may be understood in specific cases to those skilled in the art.

What is claimed is:

1. A lace fabric of a helical structure containing twisted optical fiber threads, comprising light guiding threads, an external sleeve and braided ropes; wherein the light guiding threads and the braided ropes are mutually twisted to form a whole body; the external sleeve is further sleeved outside the light guiding threads and the braided ropes; an LED light source module is arranged at the outer parts of the light guiding threads and the braided ropes; a light-emitting end of the LED light source module and the light guiding threads are arranged opposite to each other, the braided ropes are formed by interweaving high-strength fiber threads and reflective threads, and each high-strength fiber thread is formed by helically twisting and weaving a color or various colors of dyed fiber threads; and an inner cavity of the external sleeve is further internally provided with a plurality of tensile strands, and the tensile strands are high-strength PE threads or steel wires.

2. The lace fabric of the helical structure containing the twisted optical fiber threads according to claim 1, wherein three light guiding threads are provided; four braided ropes are provided; and the light guiding threads and the braided ropes are mutually wound in the helical structure.

3. The lace fabric of the helical structure containing the twisted optical fiber threads according to claim 1, wherein the external sleeve is made of a soft transparent PVC, silica gel or TPE material; and a wear resistant layer is arranged at the outer part of the external sleeve and is made of transparent rubber.

4. The lace fabric of the helical structure containing the twisted optical fiber threads according to claim 1, wherein the light guiding threads are polymeric light guiding fibers; and each polymeric light guiding fiber comprises a core material and a jacketing sheath material.

5. The lace fabric of the helical structure containing the twisted optical fiber threads according to claim 4, wherein the core material is a high-purity and high-transparency polymethyl methacrylate or polystyrene fiber; and the jacketing sheath material is a fluorine-containing polymer or organic silicone polymer.

6. A production method for the lace fabric of the helical structure containing the twisted optical fiber threads, comprising the following steps:
- S1, preparing light guiding threads, specifically, coating outer layers of fibers prepared by withdrawing threads from high-purity and high-transparency polymethyl methacrylate or polystyrene with fluorine-containing polymer or organic silicone polymer to prepare polymeric light guiding fibers;
- S2, preparing braided ropes, specifically, stranding high-strength fiber threads and reflective threads through a strander for interweaving, and adhering and fixing the woven high-strength fiber threads and reflective threads by brushing a thermosetting adhesive to prepare the braided ropes for standby;
- S3, stranding wires, specifically, making a plurality of light guiding threads and braided ropes arranged at intervals and closely arranged into a bundle, and stranding the bundle with the strander to prepare a helically twisted wire;
- S4, externally coating rubber, specifically, forming a rubber protective layer on the outer surface of the helically twisted wire through extrusion molding of an elastomer material with a plastic extruder to prepare an external sleeve;
- S5, conducting light-transmissive detection, specifically, detecting whether a back end portion of the lace fabric emits light by aligning an LED light source to the light guiding threads; and
- S6, tailoring and packaging, specifically, tailoring a qualified light transmissive product according to a design size, and packaging the tailored product for shipping out.

7. The production method for the lace fabric of the helical structure containing the twisted optical fiber threads according to claim 6, wherein in the step S3 of stranding the wires, tensile strands provided with a plurality of high-strength PE threads or steel wires are further mixed in the wires, arranged into a bundle and then stranded by the strander.

* * * * *